Nov. 9, 1971  TAKAMITU NOZAWA  3,618,161
HINGE MECHANISM WITH SPRING ACTION
Filed April 29, 1969  2 Sheets-Sheet 1

Nov. 9, 1971 TAKAMITU NOZAWA 3,618,161

HINGE MECHANISM WITH SPRING ACTION

Filed April 29, 1969 2 Sheets-Sheet 2

3,618,161
HINGE MECHANISM WITH SPRING ACTION
Takamitu Nozawa, Tokyo, Japan, assignor to Yoshino
  Kogyosho Co., Ltd., Tokyo, Japan
Filed Apr. 29, 1969, Ser. No. 820,245
Claims priority, application Japan, Sept. 25, 1968,
  43/69,657
Int. Cl. E05d 7/00
U.S. Cl. 16—150                                    3 Claims

ABSTRACT OF THE DISCLOSURE

A hinge mechanism consisting of a flexible and resilient member of two main portions which are connected through a thin boundary layer with a first of said portions projecting toward the second beyond the boundary layer line so that when the edge of the second is attached to a base member and the first portion is swung upwardly, the projection biases the first portion open.

The present invention relates to a hinge mechanism to be used for either a clip or container hinge, in which a principal portion of the hinge mechanism is made of flexible and elastic material which enables a spring action with a very simple mechanism without using a spring element.

Heretofore, such type of hinge used a spring element, which required a great deal of trouble in manufacturing, resulting in high cost. As an example in which a spring is not used, a hinge type clip has been used. In this case, however, the range of spring action of the hinge is restricted to about 90 degrees and only a spring action due to a molded shape is available, so that the force of the spring action is fixed and it is impossible to control the force of the spring action beyond the limitation.

The present invention provides a hinge mechanism with spring action by a quite different construction from the conventional one, and, if necessary, by applying a deformation to said mechanism the range of blocking spring action can easily be expanded to more than 90 degrees, and further by changing the length of leg piece it is possible to control the force of bounce or press as required.

The present invention will now be described in connection with the accompanying drawings, in which.

Figure 1:
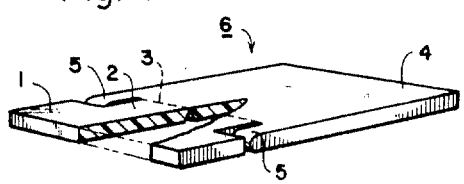
FIG. 1 is a perspective view, partly broken away, of a principal member used in the mechanism of the present invention.
Figure 2:
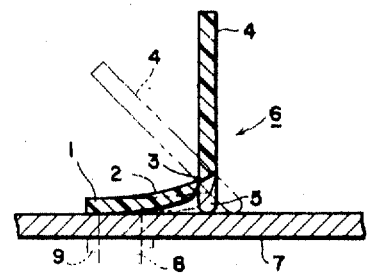
FIG. 2 is a longitudinal cross sectional view for illustrating the principle of the mechanism.

Referring now to FIGS. 1 and 2, an end of elastic arm 2 projecting from a fixed portion 1 is linked to a swing plate 4 through a flexible boundary portion 3.

On the boundary side of the swing plate 4 one or more leg pieces 5 extending towards the fixed portion are provided.

The fixed portion 1 of a hinge plate 6 thus formed is secured to a base member 7. When the outward end of the swing plate 4 is pushed upwardly, as shown in FIG. 2 the tip end of the leg piece 5 is pivoted about a point in the plane containing the base member 7. At this time, since the boundary portion 3 is flexible and is connected to the arm 2 and the swing plate 4, the tip end of the arm 2 is elevated as the boundary portion 3 moves upwardly due to rising of the swing plate 4, and hence the arm 2 is bent against the elasticity of the arm itself. As seen in dotted lines in FIG. 2, when the swing plate 4 swings beyond 90 degrees, the arm 2 falls due to its own elasticity and the swing plate 4 falls down over the arm 2 and the fixed portion 1. In other words, by the swing of the leg piece 5 due to the swing plate 4, the pivot point of which swing is on a plane containing the base member 7 in the present embodiment, the arm 2 is deformed, and the stress produced by such deformation is produced on the swing plate 4 through the boundary portion 3. The same operation will occur when the swing plate 4 is to be reset.

Preferably, the hinge plate 6 is integrally molded with a flexible synthetic resin, and it is desirable that the sliding surface on the base member 7 of the leg piece 5 is smooth and hard in order to reduce friction. Thus, if the base member 7 is insufficient to meet such requirements, a sliding plate may be provided between the base member 7 and the leg piece 5. Securing of the fixed portion 1 to the base member 7 may be effected with an adhesive material, or, as shown in FIG. 2 they may be fastened by a wedge 9 and mount 8 projecting from under surface of the fixed portion 1. Many other methods can be employed.

Figure 6:
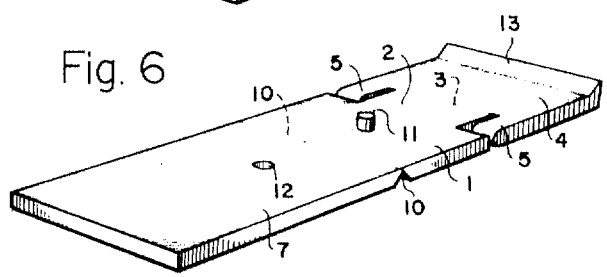
FIG. 6 is an exploded perspective view of a paper holder having the mechanism of the present invention integrally formed.

The hinge plate 6 may not necessarily be a separate member from the base member 7. For example, if they are molded as shown in FIG. 6, an integrally molded paper holder may be provided. In FIG. 6, 10 designates a folding channel for the base member 7 and the hinge plate 6, 11 designates a fitting element, 12 an opening therefor, and 13 a mating edge formed at the outward end of the swing plate 4.

Figure 4:
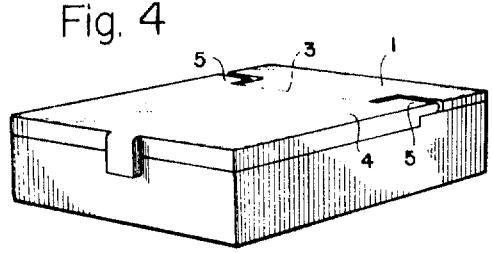
FIG. 4 is a perspective view of a container box with the mechanism of the present invention.
Figure 3:
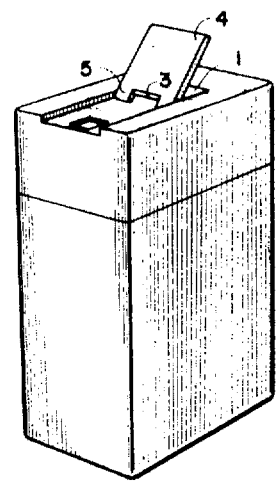
FIG. 3 is a perspective view of a shaking container having a cap embodying the mechanism of the present invention.
Figure 5:
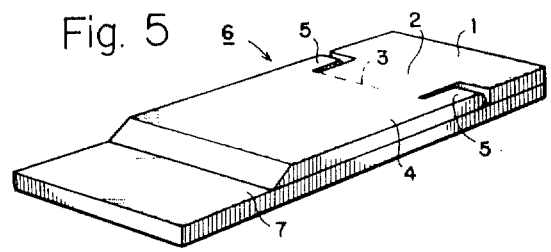
FIG. 5 is a perspective view of a paper holder with the mechanism of the present invention.
Figure 8:
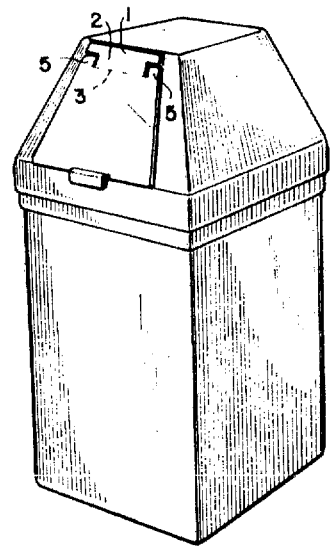
FIG. 8 is a perspective view of a waste paper basket with the mechanism of the present invention.
Figure 7:
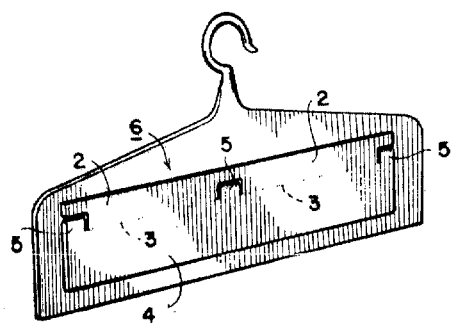
FIG. 7 is a perspective view of a coat hanger with the mechanism of the present invention.

FIGS. 3 through 8 illustrate examples in which the mechanisms described in connection with FIGS. 1 and 2 are applied to particular articles; wherein FIG. 3 shows an application to a shaking box, FIG. 4 to a container box, FIGS. 5 and 6 to a paper holder, FIG. 7 to a coat hanger, and FIG. 8 to a waste paper basket, the same reference numbers as those used in FIGS. 1 and 2 being used.

In the coat hanger shown in FIG. 7, a plurality of leg pieces 5 are provided at three points, i.e. right hand, left hand and central portions, and arms 2 are provided at two points, i.e. right and left sides of the central leg piece 5. With this arrangement the swing plate 4 can be made wider and can make its spring action stronger.

Figure 9:
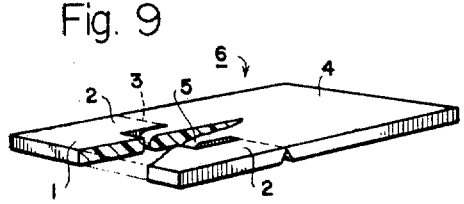
FIG. 9 is a perspective view, partly broken away, of a principal member to be used for another embodiment.
Figure 10:
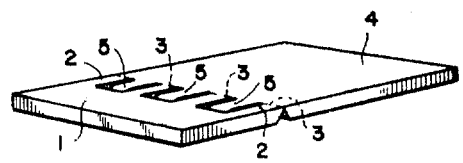
FIG. 10 is a perspective view of a principal member to be used for further embodiment.

A single leg piece 5 may be arranged between two arms 2 provided on both sides as shown in FIG. 9, or, as shown in FIG. 10, a number of arms 2 and a number of leg pieces 5 may be juxtaposed.

As seen from these examples, the swing plate 4 may be used as a closure or holder plate, or it may be used as a tool for a linking closure, holder plate or door to a container body, base thereof or wall thereof.

Figure 11:
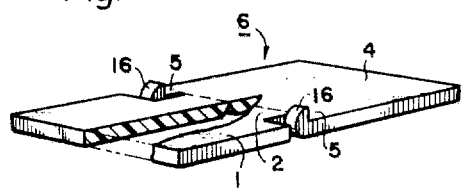
FIG. 11 is a perspective view, partly broken away, of a principal member to be used for a still further embodiment.
Figure 12:
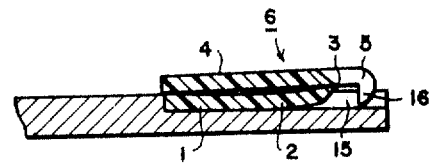
FIG. 12 is a longitudinal sectional view showing the spring action thereof.

The examples shown in FIGS. 11 and 12 differ from the above examples, and they illustrate examples in which the upper surface of the swing plate 4 and upper surfaces of fixed portion 1 and arm 2 are used as holder plate. With such an arrangement, projections 16 are provided at the upper edges of tip ends of the leg pieces 5 as shown in FIG. 11, and hence, when the swing plate 4 is down as shown in FIG. 12, the tip ends of the projections 16 engage the surface of the base member 7 and at the same time the outward end of the swing plate 4 comes in contact with the fixed portion 1 or base member 7. In this case, if the design is such that the boundary portion 3 is lifted and the elasticity of the arm 2 influences the swing plate 4 through the boundary portion 3, a sufficient holder function is provided.

Thus, as to the enhancement of holder function by projection formation, the same is true for the cases of FIGS. 1 and 2. In these cases projection may be provided at the back surface of the tip end of the leg piece 5. It is thus possible for the block spring action range to exceed 90 degrees.

Figure 13:
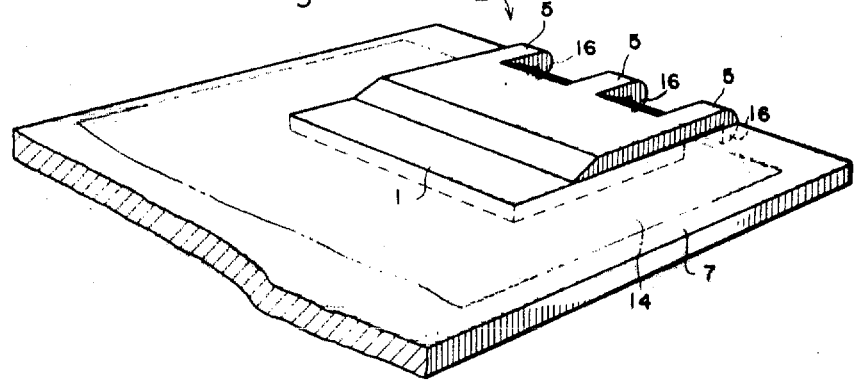
FIG. 13 is a perspective view of a paper holder incorporating the mechanism of the present invention.

FIG. 13 shows an application of the examples shown in FIGS. 11 and 12 to a paper holder, in which 14 designates held paper. In FIG. 12, 15 designates a recess for receiving hinge plate 6, which may be arranged as required.

The above embodiments are only parts of a number of possible embodiments of the present invention and it should be noted that the scope of the present invention is not limited to the particular embodiments.

With the construction of the present invention, it may be applicable to a number of articles as a hinge mechanism with spring action and the mechanism is easy to make, cheap in cost and suitable for mass production.

What is claimed is:

1. A hinge mechanism comprising a flexible and resilient fixed member, a base member, an area of said fixed member opposite one edge area thereof being connected to said base member, a hinge member connected through a thin flexible boundary portion of reduced thickness to said edge of said fixed member, said hinge member having at least one arm portion extending towards said fixed member and terminating beyond the boundary portion, said arm portion having a perpendicular projection on its surface opposite said base member, said base member having a surface extending under said boundary portion and the terminus of said arm portion whereby when the hinge member is swung upward the arm portion rides along the surface of the base member flexing said edge area of the fixed member up until the hinge member is swung through more than 90° whereupon the resiliency of the fixed member acts to snap the hinge member open, said perpendicular projection on the surface of the arm portion providing a biasing action tending to maintain the open hinge member against the top surface of the fixed member.

2. A hinge mechanism as in claim 1 wherein the fixed member and hinge members are integral.

3. A hinge mechanism as in claim 1 wherein the fixed member, base member and hinge member are integral, the fixed member and base member being connected by a thin boundary layer on the fixed member edge opposite the edge connected to the hinge member, and including means to secure a surface area of the fixed member to the base member.

References Cited

FOREIGN PATENTS 748,726 12/1966 Canada _____ 220—31 SR

BOBBY R. GAY, Primary Examiner

DORIS L. TROUTMAN, Assistant Examiner

U.S. Cl. X.R.

220—31